US012019401B2

(12) United States Patent
Franzi

(10) Patent No.: US 12,019,401 B2
(45) Date of Patent: Jun. 25, 2024

(54) DEWAR DEVICE FOR MECHANICAL AND/OR FUNCTIONAL COMPONENTS OF A WATCH

(71) Applicant: Omega SA, Biel/Bienne (CH)

(72) Inventor: Edoardo Franzi, Cheseaux-Noréaz (CH)

(73) Assignee: Omega SA, Biel/Bienne (CH)

(*) Notice: Subject to any disclaimer, the term of this patent is extended or adjusted under 35 U.S.C. 154(b) by 159 days.

(21) Appl. No.: 17/500,212

(22) Filed: Oct. 13, 2021

(65) Prior Publication Data

US 2022/0179367 A1 Jun. 9, 2022

(30) Foreign Application Priority Data

Dec. 9, 2020 (EP) .................................... 20212864

(51) Int. Cl.

| | |
|---|---|
| ***G04B 37/04*** | (2006.01) |
| ***G04B 37/02*** | (2006.01) |
| ***G04B 43/00*** | (2006.01) |
| ***G04G 17/08*** | (2006.01) |

(52) U.S. Cl.

CPC ............. *G04B 37/04* (2013.01); *G04B 37/02* (2013.01); *G04B 43/005* (2013.01); *G04G 17/08* (2013.01)

(58) Field of Classification Search

CPC ...... G04B 37/04; G04B 43/005; G04B 37/02; G04G 17/08

See application file for complete search history.

(56) References Cited

U.S. PATENT DOCUMENTS

| | | | | |
|---|---|---|---|---|
| 3,030,763 A * | 4/1962 | Klingenberg | G04B 39/02 368/291 |
| 3,740,944 A * | 6/1973 | Chopard | G04B 43/005 368/286 |
| 9,778,619 B2 * | 10/2017 | Zaugg | G04C 3/064 |
| 10,494,080 B2 * | 12/2019 | Clemen, Jr. | B64C 1/40 |
| 2012/0155230 A1 | 6/2012 | Patt | |
| 2013/0258817 A1 * | 10/2013 | Corvino | G04C 3/004 368/29 |
| 2019/0338807 A1 * | 11/2019 | Willmot | B64G 1/50 |

FOREIGN PATENT DOCUMENTS

| | | |
|---|---|---|
| CN | 203747909 U | 7/2014 |
| CN | 106325041 A | 1/2017 |
| FR | 2 752 959 A1 | 3/1998 |

OTHER PUBLICATIONS

European Search Report issued May 18, 2021 in European Application 20212864.1, filed on Dec. 9, 2020, 3 pages (with English Translation of Categories of Cited Documents).

Notice of Grounds for Rejection dated Feb. 21, 2024 issued in corresponding Korean patent application No. 10-2021-0159621 (with English translation).

* cited by examiner

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A Dewar device is for mechanical and/or functional components of a watch. The device is provided with a wristlet and a casing. The casing includes a chamber in which a case of the watch is capable of being arranged in a removable manner, and a device for reversible fastening by magnetic levitation of the watch case in the chamber configuring a separation between the case and the set of the elements of the casing forming the chamber.

13 Claims, 1 Drawing Sheet

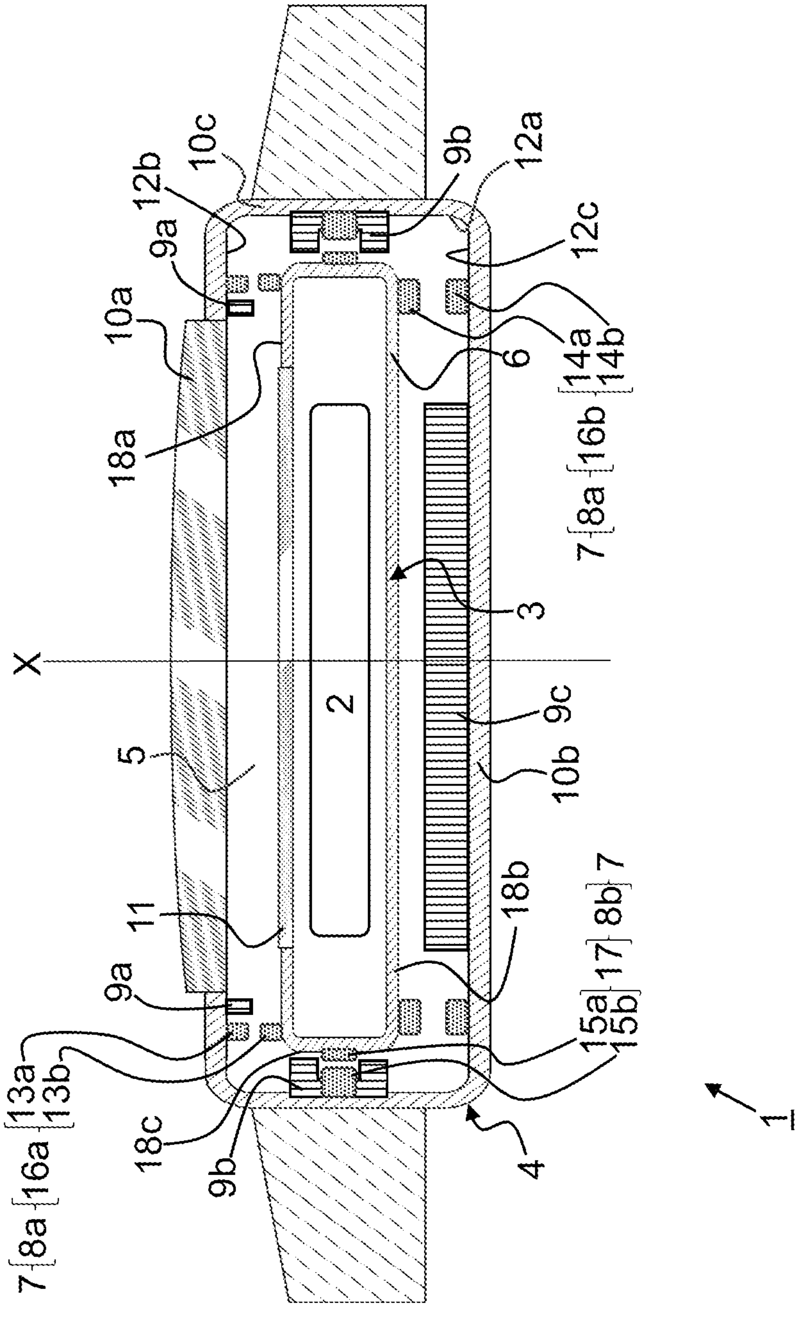
10c
12b
9a
10a
18a
9b
12a
12c
6
14a
14b
16b
8a
7
3
X
2
9c
10b
5
11
18b
8b
17
15a
15b
13a
13b
16a
18c
4
1

DEWAR DEVICE FOR MECHANICAL AND/OR FUNCTIONAL COMPONENTS OF A WATCH

CROSS-REFERENCE TO RELATED APPLICATION

This application claims priority to European Patent Application No. 20212864.1 filed on Dec. 9, 2020, the entire disclosure of which is hereby incorporated herein by reference.

TECHNICAL FIELD

The invention relates to a Dewar device for mechanical and/or functional components of a watch in particular adapted to operate at extreme temperatures.

TECHNOLOGICAL BACKGROUND

An electronic watch conventionally comprises a wristlet and a watch case including several electric or electronic components. It is known in the prior art that some of these components cannot handle extreme temperatures and stop operating correctly at these temperatures. Typically, the LCD liquid crystal displays using light-emitting diodes or quartz tolerate temperatures not exceeding approximately 80° C. (degrees Celsius) and not going below 0° C. However, in specific environments such as for example space or lunar missions, the temperatures can frequently reach values of approximately substantially −150° C. to +125° C.

There is therefore a need to be able to use a watch in particular an electronic watch in environments in which such extreme temperatures can exist.

SUMMARY OF THE INVENTION

For this purpose, the invention relates to a Dewar device for mechanical and/or functional components of a watch, said device being provided with a wristlet and a casing, said casing including:

- a chamber in which a case of said watch is capable of being arranged in a removable manner, and
- a device for reversible fastening by magnetic levitation of said watch case in said chamber configuring a separation between said case and the set of the elements of the casing forming this chamber.

Via the Dewar device formed by the casing and the watch case the mechanical and/or functional components of the watch are protected from possible extreme temperatures between −150 and +125 degrees Celsius that can exist outside of said device. Moreover, said at least one linking element ensuring the fastening of the watch case to the casing participates in ensuring very good thermal insulation of the case by preventing any heat loss of this watch case 6 in particular by radiation. Thus, such a Dewar device allows to use mechanical and/or functional components in contexts and environments in which the temperatures can be extreme, like for example during space exploration missions such as the exploration of the planet Mars or of the moon. This also allows to ensure a rationalisation of the costs and to maintain a reasonable complexity for the components used in watches used for such missions.

In other embodiments:

- the fastening device comprises two magnetic modules and at least one stop member;

- the fastening device comprises a first magnetic module for adjusting and maintaining an axial position of the watch case in the chamber with respect to a glass and/or a bottom of said casing 4, said axial position being defined with respect to a central axis of the casing;
- the first module comprises at least two pairs of elements generating a magnetic field with a first pair, the elements of which are disposed facing one another while being respectively located on an upper face of the watch case and on a first inner face of the chamber comprising a glass of said casing;
- the first module comprises at least two pairs of elements generating a magnetic field with a second pair, the elements of which are disposed facing one another while being respectively located on a lower face of the case comprising a bottom of the watch and on a second inner face of the chamber comprising a bottom of said casing;
- the fastening device comprises a second magnetic module for adjusting and maintaining a radial position of the watch case in the chamber of the casing with respect to an inner peripheral wall of said chamber, said radial position being defined with respect to a central axis of the casing;
- the second module comprises at least one pair of elements generating a magnetic field, said elements being disposed facing one another while being respectively located on an outer peripheral wall of the watch case and an inner peripheral wall of the chamber of the casing;
- the elements generating a magnetic field of each of these pairs include parts arranged facing each other comprising magnetic poles having identical polarity;
- said at least one stop member is arranged on all or a part of an inner peripheral wall of the chamber and/or of a first inner face of the chamber comprising a glass of the casing and/or of a second inner face of the chamber comprising a bottom of the casing;
- the fastening device comprises a plurality of stop members respectively arranged on all or a part of an inner peripheral wall of the chamber, of a first inner face of the chamber comprising a glass of the casing and of a second inner face of the chamber comprising a bottom of the casing;
- said chamber is under vacuum or almost under vacuum;
- the casing comprises a glass, the surface area of which is substantially greater or strictly greater than a glass of the watch case;
- a glass of the watch case is disposed facing a glass of the casing when the watch case is arranged in said chamber;
- the device comprises a middle onto which said wristlet is fastened;
- said set of elements of the casing forming said chamber comprises a glass, an inner peripheral wall of a middle and a bottom of this casing.

BRIEF DESCRIPTION OF THE DRAWINGS

Other particularities and advantages will be clear from the description that is made thereof below, for informational purposes and in no way limiting, in reference to the appended FIG. 1 which is a cross-sectional view of a diagram of a Dewar device for mechanical and/or functional components of a watch comprising a device for reversible fastening by magnetic levitation participating in the arrangement of a case of this watch in said Dewar device, according to an embodiment of the invention.

DETAILED DESCRIPTION OF THE INVENTION

FIG. 1 shows a vacuum-insulated horological device 1 for mechanical and/or functional components 2 of a watch 3 also called horological Dewar device or more simply in the rest of the description "Dewar device". Such a Dewar device 1 for mechanical and/or functional components 2 of a watch 3 is capable of participating in conferring good thermal insulation on mechanical and/or functional components 2 of the watch 3, a case 6 of which must be arranged in this casing 4 of the device 1 in order to ensure such an insulation for these components 2. In other words, this Dewar device 1 is in particular formed by the combination of its casing 4 and of the watch 3 case 6 in order to ensure suitable thermal insulation for these mechanical and/or functional components 2. In this configuration, the watch 3 case 6 is arranged in a chamber 5 while being maintained remote or at a distance from the set of the elements 10*a* to 10*c* of the casing 4 forming this said chamber 5 namely a glass 10*a*, an inner peripheral wall 12*a* of a middle 10*c* and a bottom 10*b* of this casing 4. It is noted that this inner peripheral wall 12*a* is also that of said chamber 5.

This remoteness or this distance or this separation is configured on the basis of a device 7 for reversible fastening by magnetic levitation of said watch 3 case 6 in said chamber 5. In other words, such a fastening device 7 is capable of configuring a separation between said case 6 and the set of the elements 10*a*, 10*b*, 10*c* of the casing 4 forming said chamber 5 of the casing. This fastening device 7 that is described below participates in reducing or even in eliminating all heat conduction between the inner peripheral wall 12*a* of the middle 10*c* and/or the bottom 10*b* and/or the glass 10*a* with the watch 3 case 6 in particular with an outer global face of this case 6. This outer global face includes an upper face 18*a* comprising the glass 11 of the case 6 of this watch 3, a lower face 18*b* comprising a bottom 18*b* of said case 6 and an outer peripheral wall 18*c* of a middle of this case 6.

It is noted that such a case 6 is comprised in a watch 3 that can be an electronic watch for example a quartz watch, or a mechanical watch.

The mechanical and/or functional components 2 of the watch 3, mentioned above, comprise in a non-limiting and non-exhaustive manner: an horological movement, a dial, hands, rings, joints and/or electronic and/or electric components 2. It is noted in particular that such electronic and/or electric components include for example a display device, a processor, a memory, a component for storing energy, a motor, an integrated circuit and an electronic oscillator, etc.

It is thus understood that in this configuration, this Dewar device 1 has the same properties and features as a Dewar tube/flask well known in the prior art. As mentioned above, the properties and features of this Dewar device 1 participate in conferring onto it good thermal insulation with regard to temperatures that are in particular extreme that can exist in the outside environment in which such a device 1 can be located.

In this context, this device 1 thus comprises the casing 4 that includes the middle 10*c* onto which a wristlet allowing a user of this device 1 to wear it is mounted. This casing 4 also includes the glass 10*a* and the bottom 10*b* mentioned earlier. In this device 1, it is noted that the glass 10*a* preferably comprises a surface area that is substantially greater or strictly greater than the glass 11 of the watch 3 case 6.

As mentioned, the glass 10*a*, the middle 10*c* and the bottom 10*b* of this device 1 together define the chamber 5 of this casing 4 which is capable of receiving the watch 3 case 6. These three elements 10*a* to 10*c* of the casing 4, the middle 10*c*, the glass 10*a* and the bottom 10*b* can be distinct elements that are joined together to build this chamber 5. Alternatively, the middle 10*c* and the bottom 10*b* of the casing 4 can together form a one-piece part, said one-piece part defining an opening opposite to the bottom 10*b* that is capable of being enclosed by the glass 10*a*, in a reversible and sealed manner. In one alternative, the middle 10*c* and the glass 10*a* of the watch 3 casing 4 can together form a one-piece part, said one-piece part defining an opening opposite to the glass 10*a* that is capable of being enclosed by the bottom 10*b*, also in a reversible and sealed manner.

The middle 10*c* and the bottom 10*b* are preferably made in a non-limiting and non-exhaustive manner from a metal material, from glass or from thermosetting or thermoplastic polymer resins reinforced with carbon or glass fibres or from ceramic materials. It is noted that when the middle 10*c* and the bottom 10*b* are transparent or semi-transparent while being for example made of glass, the peripheral wall 12 of the middle 10*c* and the bottom 10*b* can be coated with a metal reflective or similar coating/lining, for example such as a layer of silver.

In addition, the device 1 can comprise an interferometric filter arranged on an outer global face of the casing 4 namely on an outer peripheral wall of the middle 10*c* and/or outer faces of the glass 10*a* and of the bottom 10*b* of this watch 3 case 6. This interferometric filter can be a grid or a lattice forming a coating on this outer global face of the casing 4. This grid or lattice has a mesh, the dimensions of which are such that they only let certain predetermined wavelengths of the electromagnetic spectrum pass, typically the wavelengths of the visible range.

Moreover in this device 1, when the watch 3 case 6 is arranged in the chamber 5 of the casing 4, the space defined between this case 6 and the inner peripheral wall 12*a* of the middle 10*c*, the bottom 10*b* and the glass 10*a* is empty of material or almost empty. In other words, the chamber 5 is under vacuum or almost under vacuum.

With a view to ensuring the maintaining of the watch 3 case 6 in this chamber 5, the Dewar device 1 and in particular the casing 4 comprises the device 7 for reversible fastening by magnetic levitation of this watch 3 case 6 in the chamber 5. In this configuration the watch 3 case 6 is arranged in a removable manner in this chamber 5.

In reference to FIG. 1, this fastening device 7 preferably comprises two magnetic modules 8*a*, 8*b*, first and second modules 8*a*, 8*b*, and at least one stop member 9*a*, 9*b*, 9*c*. This first module 8*a* is a magnetic module 8*a* for adjusting and maintaining an axial position of the watch 3 case 6 in the chamber 5 with respect to the glass 10*a* and/or the bottom 10*b* of said casing 4.

In this context, it is noted that the casing 4 preferably has an axial symmetry with respect to a central axis X. The term "axial" designates a general direction parallel to the central axis X. As for the term "radial", it designates a general direction following an axis perpendicular to and intersecting the central axis X.

Such a first module 8*a* comprises at least two pairs 16*a*, 16*b* of elements generating a magnetic field 13*a*, 13*b*, 14*a*, 14*b*.

In a first pair 16*a* of this first module 8*a*, the elements 13*a*, 13*b* are disposed facing one another while being respectively located on an upper face 18*a* of the watch 3 case 6 and on a first inner face 12*b* of the chamber 5 comprising the glass 10*a* of said casing 4. More precisely, these elements 13*a*, 13*b* extend entirely or partly in a continuous or discontinuous manner around the glasses respectively of the casing 4 and of the watch 3 case 6.

In a second pair 16*b*, the elements 14*a*, 14*b* of which are disposed facing one another while being respectively located on a lower face 18*b* of the case 6 comprising the bottom of the watch 3 and on a second inner face 12*c* of the chamber 5 comprising the bottom 10*b* of the casing 4.

As mentioned, the fastening device 7 also comprises a second magnetic module 8*b*. This second module 8*b* is a module for adjusting and maintaining the radial position of the watch 3 case 6 in the chamber 5 of the casing 4 with respect to an inner peripheral wall 12*a* of said chamber 5. This second module 8*b* comprises at least one pair 17 of elements generating a magnetic field 15*a*, 15*b*, said elements 15*a*, 15*b* being disposed facing one another while being respectively located on the outer peripheral wall 18*c* of the watch 3 case 6 and the inner peripheral wall 12*a* of the chamber 5 of the casing 4.

In these two modules 8*a*, 8*b*, the elements 13*a*, 13*b*, 14*a*, 14*b*, 15*a*, 15*b* are passive sources of magnetic field such as magnets in particular permanent magnets.

In one alternative, these elements 13*a*, 13*b*, 14*a*, 14*b*, 15*a*, 15*b* can be active sources of magnetic field like for example electromagnets. In this context, the Dewar device 1 can thus comprise a battery and a microcontroller comprising hardware and software elements controlling these electromagnets. Moreover, in this configuration, the casing 4 can be devoid of stop members 9*a*, 9*b*, 9*c*.

In these first and second magnetic modules 8*a*, 8*b*, the elements generating a magnetic field 13*a*, 13*b*, 14*a*, 14*b*, 15*a*, 15*b* of each of these pairs 16*a*, 16*b*, 17 include parts arranged facing each other comprising magnetic poles having identical polarity. In this configuration the magnetic poles of the elements 13*a*, 13*b*, 14*a*, 14*b*, 15*a*, 15*b* of each of the pairs repel each other thus engendering the creation of a separation mentioned above between the global outer face of the watch 3 case 6 and the set of the elements 10*a*, 10*b*, 10*c* of the casing 4 defining said chamber 5 of the casing 4.

Moreover, as shown, the fastening device 7 also comprises at least one stop member 9*a*, 9*b*, 9*c* which is capable of participating, with the first and second magnetic modules 8*a*, 8*b*, in maintaining the watch case 6 in the chamber 5 of the casing 4. Indeed, such a member 9*a*, 9*b*, 9*c* is capable of replacing or completing the maintaining/the fastening ensured of the case 6 by the first and second modules 8*a*, 8*b* in the chamber 5 in particular when the casing 4 undergoes an abrupt/violent/sudden acceleration, deceleration and/or change in direction for example during an impact. In this configuration, such a member is thus capable of being in contact with the upper 18*a* and/or lower 18*b* faces and/or the outer peripheral wall 18*c* of the middle of this case 6 as soon as the maintaining/the fastening ensured by the first module and/or the second module 8*a*, 8*b* is not sufficient to maintain a separation between said case 6 and the set of the elements 10*a*, 10*b*, 10*c* of the casing 4 forming this chamber 5. This member 9*a*, 9*b*, 9*c* is preferably manufactured from a material having good thermal insulation characteristics and properties such as a material for example made of cork oak, made of polyurethane (in the form of foam or a panel) and/or made of glass foam.

Such a member is arranged on all or a part of the inner peripheral wall 12*a* of the chamber 5 and/or of the first inner face 12*b* of the chamber 5 comprising the glass 10*a* of the casing 4 and/or of the second inner face 12*c* of the chamber 5 comprising the bottom 10*b* of the casing 4.

In reference to FIG. 1, in the present embodiment, the fastening device 7 comprises a plurality of stop members 9*a*, 9*b*, 9*c* that are respectively arranged on all or a part of the inner peripheral wall 12*a*, of the first inner face 12*b* and of the second inner face 12*c* of the chamber 5. More precisely, the fastening device 7 comprises three stop members 9*a*, 9*b* 9*c*.

The first member 9*a* is arranged on the first inner face 12*b* while extending entirely or partly in a continuous or discontinuous manner around the glass 10*a* of the casing 4. In this configuration, such a first member 9*a* can be located between the element generating a magnetic field 13*a* of the first pair 16*a* and the glass 10*a* of the casing 4. The second member 9*b* is arranged on the inner peripheral wall 12*a* of the chamber 5, facing the outer wall 18*c* of the watch 3 case 6. The third member 9*c* is arranged on the second inner face 12*c*, more particularly on all or a part of the bottom, while being positioned facing the lower face 18*b* of the watch 3 case 6. It is noted that the contour of this third member 9*c* can be substantially defined or strictly defined by the element generating a magnetic field 14*b* of the second pair 16*b* which is located on this second inner face 12*c*.

In addition, it is noted that the mechanical and/or functional components 2 of the watch can be non-magnetic and/or that the casing 4 of the watch can be made from a material or be covered with a coating allowing to insulate these components 2 from magnetic fields.

Moreover, the fastening device 7 contributes to disposing the watch 3 case 6 in this casing 4 in such a way that the glass 11 of this watch 3 case 6 is arranged facing the glass 10*a* of the casing 4 in such a way that the information comprised on the dial and/or the display interface of this watch 3 can be perceived through the transparent glass 10*a* of the casing 4 by the user wearing the Dewar device 1.

Thus such a Dewar device 1 provides the mechanical and/or functional components 2 of the watch 3 with very good thermal insulation with respect to the outside environment by reducing or even preventing heat loss by radiation of the components arranged in the watch case 6 for a long time. Thus, when the temperature outside of the device 1 reaches extreme values, typically approximately −125 to +125° C., the temperature inside the chamber 5 remains substantially equal to the temperature present in the watch 3 case 6 during its arrangement in the casing 4, typically approximately 20° C. It is noted that regardless of the temperature conditions existing in the environment of the Dewar device 1, the temperature present in the watch 3 case 6 is a temperature that does not hinder the correct operation of the watch. This temperature is maintained for a time that is 5 to 18 times greater than the duration for which such a watch case would be capable of preserving an operating temperature of its components 2 while being located directly in such an environment in which such temperatures in particular extreme exist (that is to say while being located outside of the casing of the Dewar device). It is thus understood that such a configuration allows to protect the mechanical and/or functional components 2 of the watch 3, as well as to participate in ensuring their operation in an optimal manner in extreme outside temperature conditions.

The invention claimed is:

1. A Dewar device for mechanical and/or functional components of a watch, said device comprising:

a wristlet and a casing, said casing comprising:

a chamber in which a case of said watch is capable of being arranged in a removable manner, and a device for fastening by magnetic levitation of said watch case in said chamber configuring a separation between said case and a set of elements of the casing forming the chamber, said set of elements of the casing forming said chamber comprising a glass on a top of the casing, an inner peripheral wall of a middle, and a bottom of the casing, wherein the fastening device comprises a first magnetic module for adjusting and maintaining an axial position of the watch case in the chamber with respect to said glass and/or said bottom of said casing, said axial position being defined with respect to a central axis of the casing.

2. The Dewar device according to claim 1, wherein said fastening device comprises two magnetic modules, including the first magnetic module, and at least one stop member.

3. The Dewar device according to claim 1, wherein the fastening device comprises a second magnetic module for adjusting and maintaining a radial position of the watch case in the chamber of the casing with respect to said inner peripheral wall of said chamber said radial position being defined with respect to a central axis of the casing.

4. The Dewar device according to claim 1, wherein said fastening device comprises a second module comprising at least one pair of elements generating a magnetic field, said elements being disposed facing one another while being respectively located on an outer peripheral wall of the watch case and said inner peripheral wall of the chamber of the casing.

5. The Dewar device according to claim 1, wherein said fastening device comprises two magnetic modules comprising pairs of elements generating a magnetic field including parts arranged facing each other comprising magnetic poles having identical polarity.

6. The Dewar device according to claim 1, wherein said fastening device comprises at least one stop member arranged on all or a part of said inner peripheral wall of the chamber and/or of a first inner face of the chamber comprising said glass of the casing and/or of a second inner face of the chamber comprising said bottom of the casing.

7. The Dewar device according to claim 1, wherein the fastening device comprises a plurality of stop members respectively arranged on all or a part of said inner peripheral wall of the chamber, of a first inner face of the chamber comprising said glass of the casing and of a second inner face of the chamber comprising said bottom of the casing.

8. The Dewar device according to claim 1, wherein said chamber is under vacuum.

9. The Dewar device according to claim 1, wherein a surface area of said glass of the casing is substantially greater or strictly greater than a glass of the watch case.

10. The Dewar device according to claim 1, wherein a glass of the watch case is disposed facing said glass of the casing when the watch case is arranged in said chamber.

11. The Dewar device according to claim 1, comprising a middle onto which said wristlet is fastened.

12. A Dewar device for mechanical and/or functional components of a watch, said device comprising:

a wristlet and a casing, said casing comprising:

a chamber in which a case of said watch is capable of being arranged in a removable manner, and a device for fastening by magnetic levitation of said watch case in said chamber configuring a separation between said case and a set of elements of the casing forming the chamber, said set of elements of the casing forming said chamber comprising a glass on a top of the casing, an inner peripheral wall of a middle, and a bottom of the casing, wherein the fastening device comprises a second magnetic module for adjusting and maintaining a radial position of the watch case in the chamber of the casing with respect to said inner peripheral wall of said chamber, said radial position being defined with respect to a central axis of the casing.

13. The Dewar device according to claim 12, wherein said fastening device comprises a first module comprising at least two pairs of elements generating a magnetic field with:

a first pair, the elements of which are disposed facing one another while being respectively located on an upper face of the watch case and on a first inner face of the chamber comprising said glass of said casing;

a second pair, the elements of which are disposed facing one another while being respectively located on a lower face of the case comprising a bottom of the watch and on a second inner face of the chamber comprising said bottom of said casing.

* * * * *